United States Patent Office 3,385,393
Patented May 28, 1968

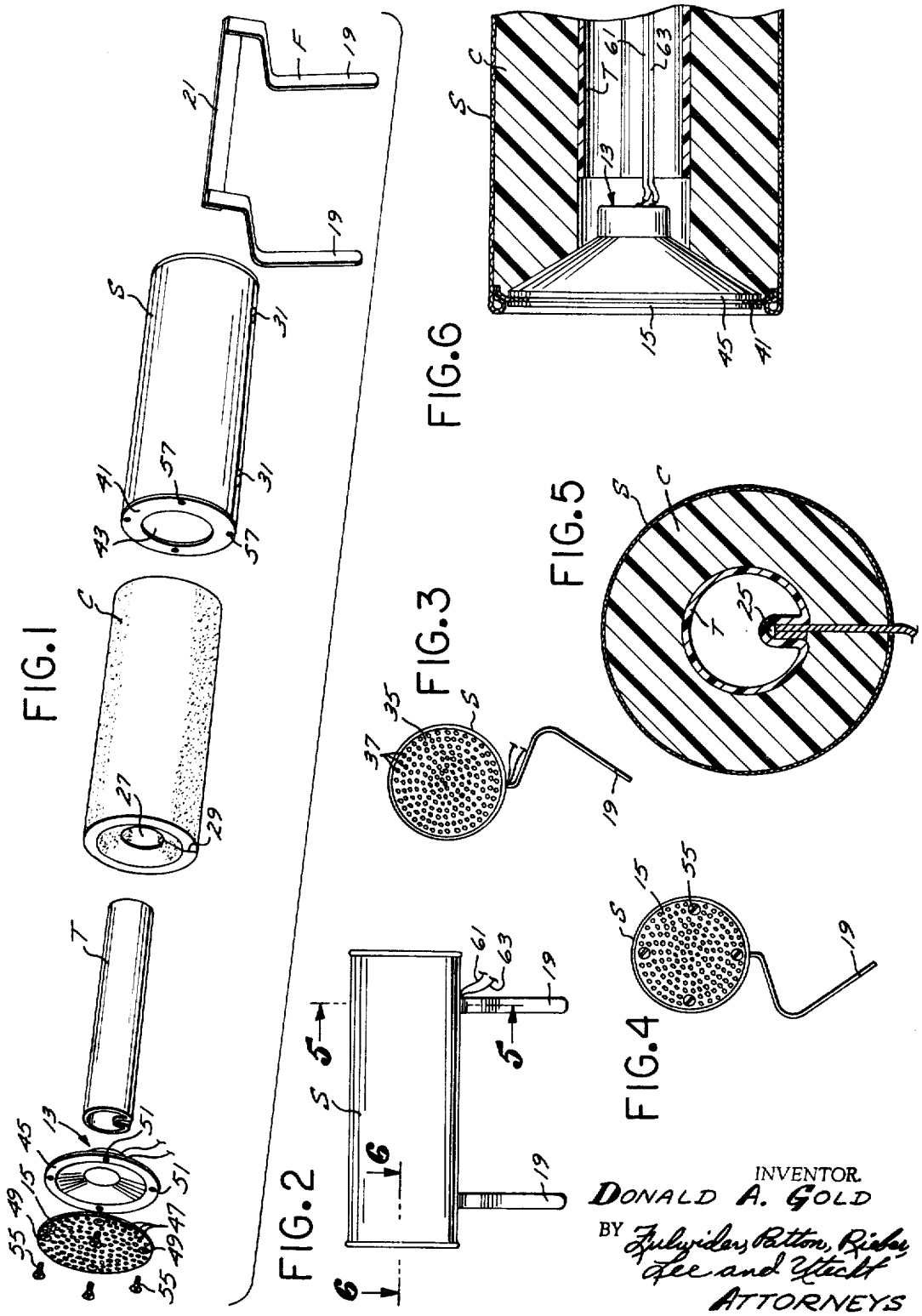

3,385,393
HEADREST AND SPEAKER APPARATUS
Donald A. Gold, North Hollywood, Calif., assignor to Pacific International Plastics, Van Nuys, Calif., a corporation of California
Filed Sept. 15, 1967, Ser. No. 668,007
5 Claims. (Cl. 181—31)

ABSTRACT OF THE DISCLOSURE

An automobile headrest and speaker apparatus comprising a frame and an elongated hollow tube supported thereon. An elongated cushion has a through longitudinal passage which receives the tube and a speaker is disposed at one end of the tube. A sleeve covers the longitudinal periphery of the cushion. A first end cover having a plurality of acoustical perforations covers the speaker and is attached at its periphery to the adjacent end of the sleeve and a second end cover covers the opposite end of the cushion and is attached at its periphery to the adjacent end of the sleeve.

BACKGROUND OF THE INVENTION

*Field of the invention*

The present invention relates generally to automobile headrests and more particularly to automobile headrests which include radio speakers.

*Description of the prior art*

There are no automobile headrests known to applicant which include radio speakers.

SUMMARY OF THE INVENTION

The headrest of present invention includes a longitudinal acoustical tube affixed to a frame and supporting an elongated cushion. A speaker is disposed at one end of the cushion and the longitudinal periphery of the cushion is covered with a sleeve. A perforated speaker cover covers the speaker and is attached at its periphery to the sleeve.

Other objects and features of the invention will become apparent from consideration of the following description taken in connection with the accompanying drawings.

DESCRIPTION OF THE DRAWING

FIG. 1 is an exploded view of an automobile headrest and speaker apparatus embodying the present invention;

FIG. 2 is a front view of the assembled headrest and speaker shown in FIG. 1;

FIG. 3 is a right-hand end view of the headrest and speaker apparatus shown in FIG. 2;

FIG. 4 is a left-hand end view of the headrest and speaker apparatus shown in FIG. 2;

FIG. 5 is a sectional view, in enlarged scale, taken along the lines 5—5 of FIG. 2; and FIG. 6 is a partial sectional view, in enlarged scale, taken along the lines 6—6 of FIG. 2.

DESCRIPTION OF THE PREFERRED EMBODIMENTS

Referring to FIG. 1, the headrest and speaker apparatus of present invention includes an elongated tube T which is supported from a frame F. A cylindrical cushion C is supported on the tube T and is covered with a complementally shaped sleeve S. A radio speaker 13 is disposed at one end of the cushion C and is covered by an end cover 15.

The frame F includes a pair of L-shaped brackets 19 for attachment to the back of an automobile seat and which are connected together by a cross bar 21. Referring to FIGS. 1 and 5, the tube T is conveniently made of a synthetic material and is formed with a longitudinal radially inwardly extending groove 25 for receiving the cross bar 21.

The cushion C is made of foam rubber and includes a longitudinal passage 27 and a radially extending longitudinal slit 29. The cushion C is installed on the tube T by being spread apart to open the slit 29 and the cushion is then brought into position over the tube T and the slit 29 permitted to close.

The sleeve S is conveniently made of plastic and includes a pair of complementally spaced slots 31 for projection of the mounting brackets 19. Referring to FIGS. 1 and 3, a circularly shaped end wall 35 is attached at its periphery to one end of the sleeve S and includes a plurality of acoustical perforations 37. An annular shaped border strip 41 is attached at its periphery to the other end of the sleeve S and defines a central opening 43 for receiving the speaker 13. The border strip 41 is made of plastic and the opening 43 is somewhat smaller than the annular mounting frame 45 of the speaker 13 whereby the mounting frame 45 can be buttoned in through the opening 43 and will be held in place by the strip 41.

The end cover 15 is made of a hard plastic and includes a plurality of acoustical perforations 47 and four equally spaced screw bores 49 which are complementally spaced to mate with threaded bores 51 included in the speaker mounting frame 45. Referring to FIG. 6, after the speaker 13 has been buttoned behind the border strip 41, the mounting plate 45 is brought into position over the border strip 41 and the screws 55 are inserted through the bores 49 in the end cover 15, and extended through the bores 57 in the border strip 41 and screwed into the threaded bores 51 included in the mounting frame 45.

A pair of electrical leads 61 and 63 are threaded through one of the slots 31 and are inserted into the end of the tube T opposite the speaker 13 and extended through the tube T to connect with the speaker 13.

From the foregoing it will be apparent that when the headrest of present invention is installed in an automobile, the speaker 13 will be in a desirable location near the listener and a volume control device (not shown) can be installed to control the volume of the individual speaker 13. The hollow tube T provides for an extremely effective sound reproduction since it acts as an acoustical chamber and the end covers 15 and 35 are perforated to enhance the resultant sound reproduction.

From the above it will be clear that the headrest of this invention is straightforward in design and construction and provides for extremely effective sound reproduction.

Various modifications and changes may be made with regard to the foregoing detailed description without departing from the spirit of the invention or the scope of the following claims.

I claim:
1. An automobile headrest and speaker apparatus comprising:
   a frame;
   an elongated tube supported from said frame and having a through passage;
   an elongated cushion having a through longitudinal passage which accepts said tube;
   a radio speaker disposed at one end of said cushion and directed outwardly therefrom;
   a sleeve covering the longitudinal periphery of said cushion;
   a first end cover overlying said speaker and affixed, at its periphery, to the adjacent end of said sleeve, said cover including a plurality of acoustical perforations for passage of sound from said speaker;

a second end cover overlying the end of said cushion, opposite said one end, and affixed at its periphery to the adjacent end of said sleeve.

2. An automobile headrest and speaker apparatus as set forth in claim 1 wherein said longitudinal passage in said cushion is enlarged at said one end of said cushion for receiving the rear portion of said speaker.

3. An automobile headrest and speaker apparatus as set forth in claim 1 wherein said second end cover includes a plurality of acoustical perforations.

4. An automobile headrest and speaker apparatus as set forth in claim 1 that includes:

a border strip extending transversely inwardly from said sleeve at said one end of said cushion and defining an opening for accepting said speaker; and wherein said speaker is inserted behind said border strip and said first end cover overlies said border strip.

5. An automobile headrest and speaker apparatus as set forth in claim 4 wherein said opening defined by said border strip is smaller than the mounting flange of said speaker and wherein said border strip is sufficiently elastic to enable said speaker to be threaded through said opening.

References Cited

UNITED STATES PATENTS

| | | | |
|---|---|---|---|
| 1,864,615 | 6/1932 | Quinby | 179—146 |
| 3,156,500 | 11/1964 | Kerr | 297—391 |
| 3,205,005 | 9/1965 | Brown | 297—397 |

STEPHEN J. TOMSKY, *Primary Examiner.*